(12) United States Patent
Eguchi

(10) Patent No.: US 7,522,349 B2
(45) Date of Patent: Apr. 21, 2009

(54) WIDE-ANGLE ZOOM LENS SYSTEM

(75) Inventor: Masaru Eguchi, Saitama (JP)

(73) Assignee: Hoya Corporation, Tokyo (JP)

( * ) Notice: Subject to any disclaimer, the term of this patent is extended or adjusted under 35 U.S.C. 154(b) by 64 days.

(21) Appl. No.: 11/839,082

(22) Filed: Aug. 15, 2007

(65) Prior Publication Data
US 2008/0252993 A1 Oct. 16, 2008

(30) Foreign Application Priority Data
Aug. 16, 2006 (JP) .............................. 2006-221733

(51) Int. Cl.
*G02B 15/14* (2006.01)
*G02B 9/34* (2006.01)
(52) U.S. Cl. .................... 359/687; 359/686; 359/774
(58) Field of Classification Search ................ 359/676, 359/683, 686, 687, 771, 772, 774, 708, 715
See application file for complete search history.

(56) References Cited

U.S. PATENT DOCUMENTS

| 5,570,233 | A | 10/1996 | Mihara et al. | |
|---|---|---|---|---|
| 6,917,476 | B2 | 7/2005 | Eguchi | |
| 6,975,461 | B2 | 12/2005 | Eguchi | |
| 7,142,372 | B2 | 11/2006 | Eguchi | |
| 7,221,518 | B2 * | 5/2007 | Kim et al. | 359/687 |
| 7,420,745 | B2 * | 9/2008 | Ohashi | 359/687 |

FOREIGN PATENT DOCUMENTS

| JP | 5 27167 | 2/1993 |
|---|---|---|
| JP | 7 20381 | 1/1995 |

OTHER PUBLICATIONS

English language Abstract of JP 5-27167.

* cited by examiner

*Primary Examiner*—William C Choi
*Assistant Examiner*—Jack Dinh
(74) *Attorney, Agent, or Firm*—Greenblum & Bernstein, P.L.C.

(57) ABSTRACT

A wide-angle zoom lens system includes a positive first lens group, a negative second lens group, a positive third lens group, and a positive fourth lens group, in this order from the object. Upon zooming from the short focal length extremity to the long focal length extremity, at least the first lens group, the second lens group and the third lens group move along the optical axis direction so that the distance between the first lens group and the second lens group increases, the distance between the second lens group and the third lens group decreases, and the distance between the third lens group and the fourth lens group increases. The wide-angle zoom lens system satisfies the following conditions:

$$-0.7 < f_w/f_2 < -0.5 \quad (1)$$

$$0.4 < X_1/f_t < 0.8 \quad (2)$$

wherein $f_w$ designates the focal length of the entire the wide-angle zoom lens system at the short focal length extremity;
$f_t$ designates the focal length of the entire the wide-angle zoom lens system at the long focal length extremity; $f_2$ designates the focal length of the positive second lens group; and
$X_1$ designates the traveling distance of the positive first lens group from the short focal length extremity to the long focal length extremity.

15 Claims, 11 Drawing Sheets

Fig.1
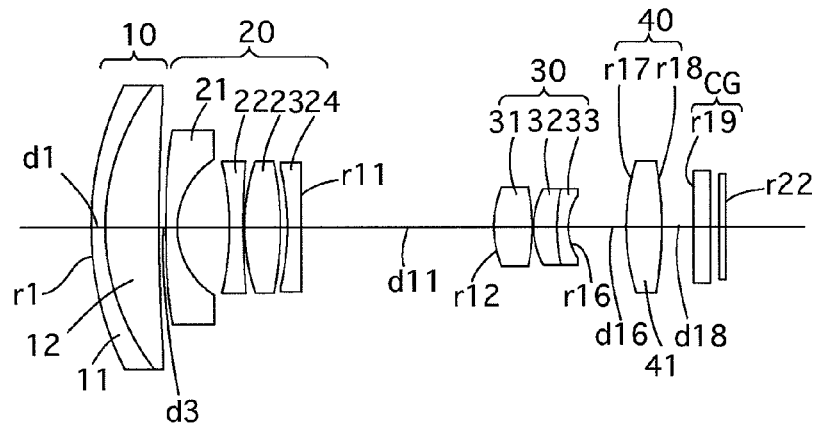
Fig.2A
FNO=1:2.6
— d Line
---- g Line
---- C Line
-0.2  0.2
SPHERICAL
ABERRATION
CHROMATIC
ABERRATION
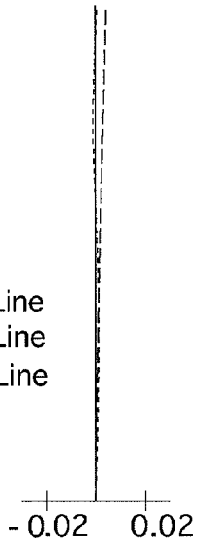
Fig.2B
W=38.9°
-0.02  0.02
LATERAL
CHROMATIC
ABERRATION
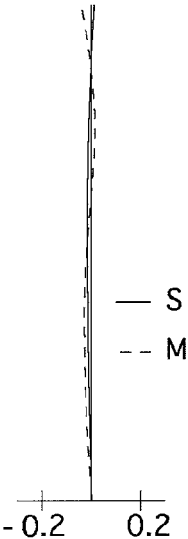
Fig.2C
W=38.9°
— S
-- M
-0.2  0.2
ASTIGMATISM
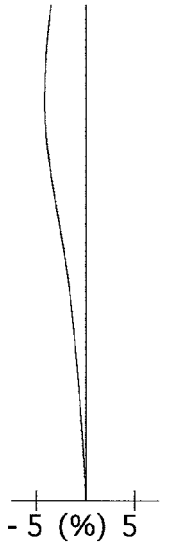
Fig.2D
W=38.9°
-5 (%) 5
DISTORTION

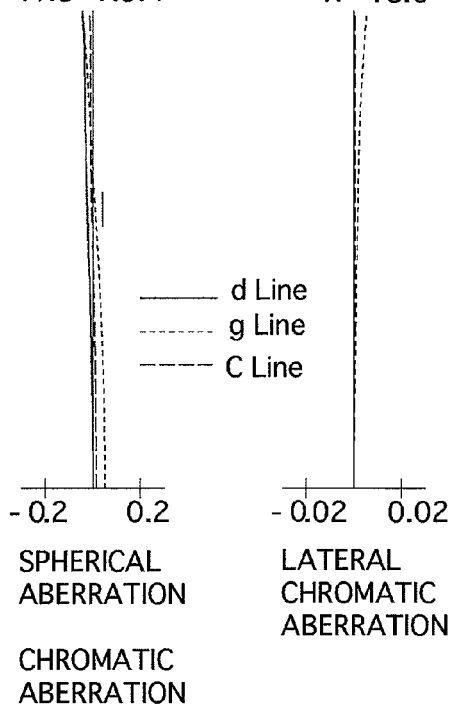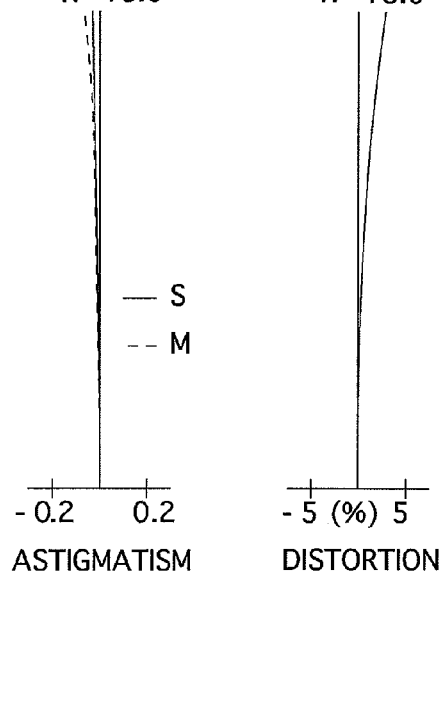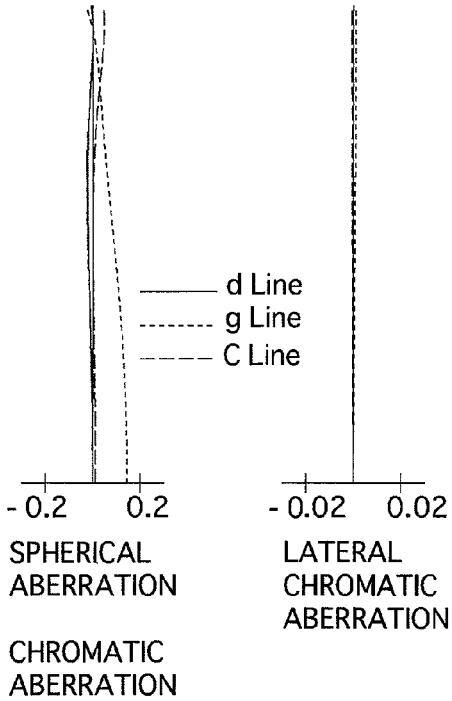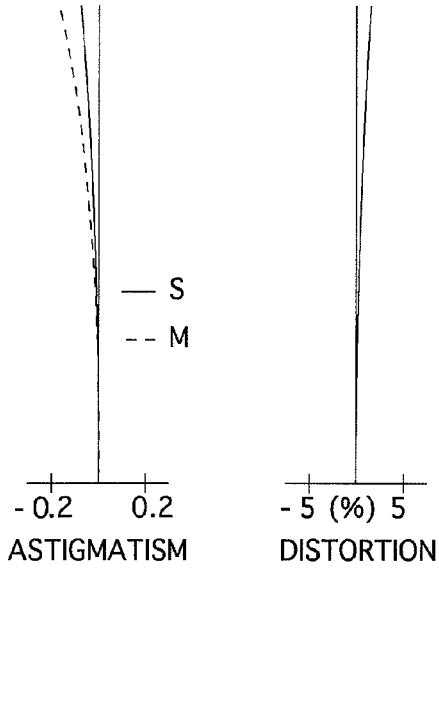

FNO= 1: 2.8

— d Line
----- g Line
---- C Line

-0.2  0.2
SPHERICAL
ABERRATION
CHROMATIC
ABERRATION

W= 39.3°

-0.02  0.02
LATERAL
CHROMATIC
ABERRATION

W= 39.3°

— S
-- M

-0.2  0.2
ASTIGMATISM

W= 39.3°

-5 (%) 5
DISTORTION

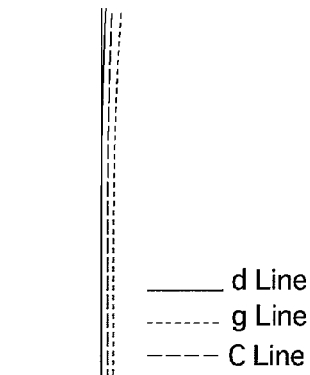
Fig.7A
FNO=1: 4.5
—— d Line
------ g Line
---- C Line
-0.2  0.2
SPHERICAL
ABERRATION
CHROMATIC
ABERRATION
Fig.7B
W=13.7°
-0.02  0.02
LATERAL
CHROMATIC
ABERRATION
Fig.7C
W=13.7°
—— S
-- M
-0.2  0.2
ASTIGMATISM
Fig.7D
W=13.7°
-5 (%) 5
DISTORTION
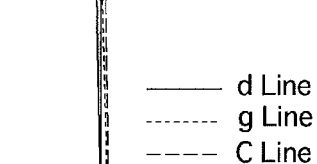
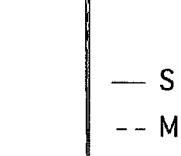
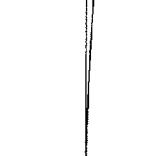
Fig.8A
FNO=1: 4.9
—— d Line
------ g Line
---- C Line
-0.2  0.2
SPHERICAL
ABERRATION
CHROMATIC
ABERRATION
Fig.8B
W=8.5°
-0.02  0.02
LATERAL
CHROMATIC
ABERRATION
Fig.8C
W=8.5°
—— S
-- M
-0.2  0.2
ASTIGMATISM
Fig.8D
W=8.5°
-5 (%) 5
DISTORTION

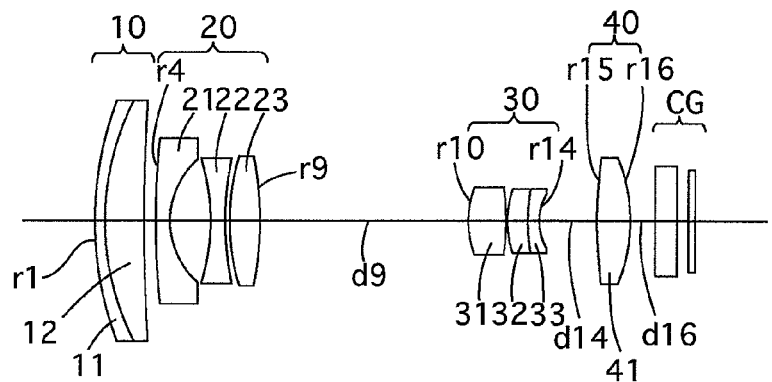
Fig. 9
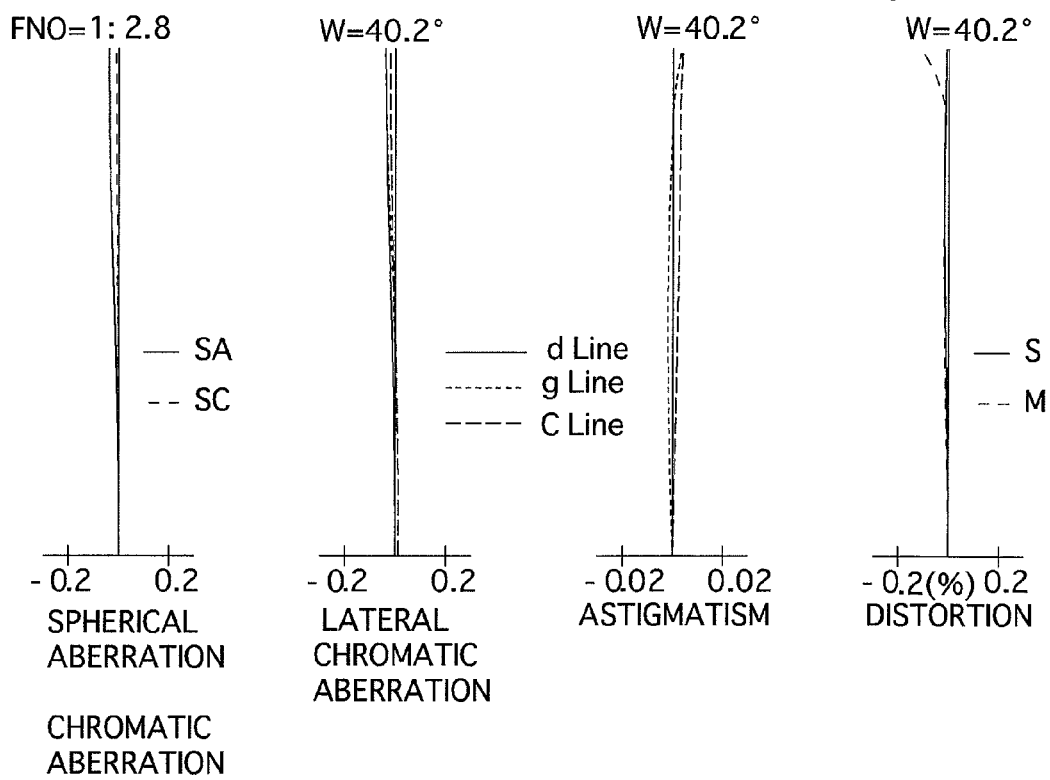

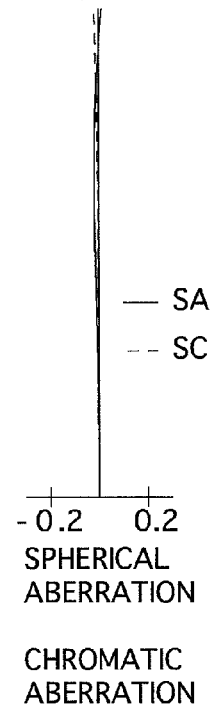
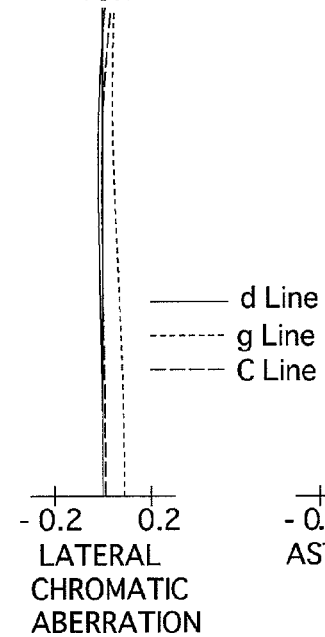
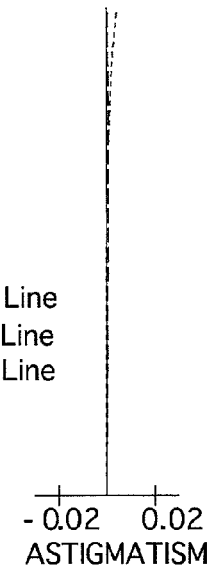
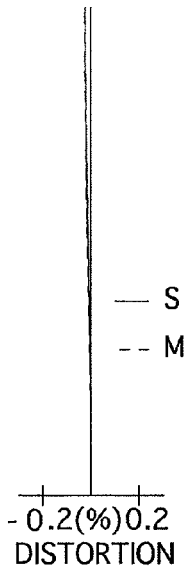
Fig.11A
FNO= 1: 4.2
— SA
-- SC
-0.2  0.2
SPHERICAL
ABERRATION
CHROMATIC
ABERRATION
Fig.11B
W=15.7°
—— d Line
------ g Line
---- C Line
-0.2  0.2
LATERAL
CHROMATIC
ABERRATION
Fig.11C
W=15.7°
-0.02  0.02
ASTIGMATISM
Fig.11D
W=15.7°
— S
-- M
-0.2(%)0.2
DISTORTION
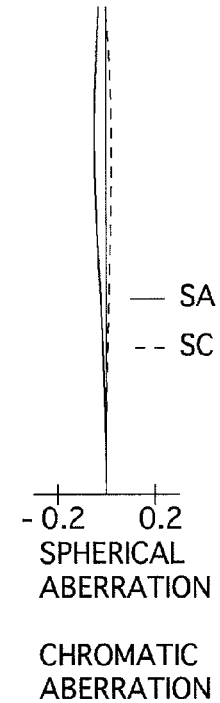
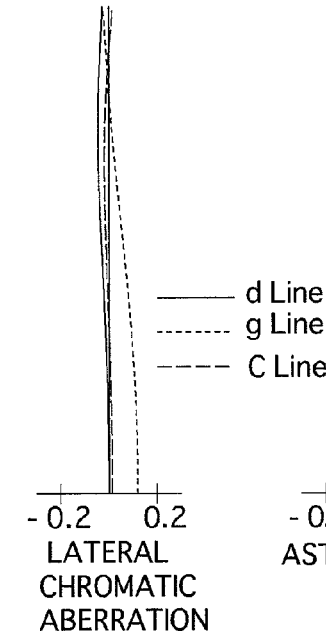
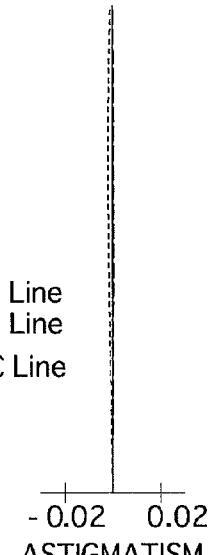
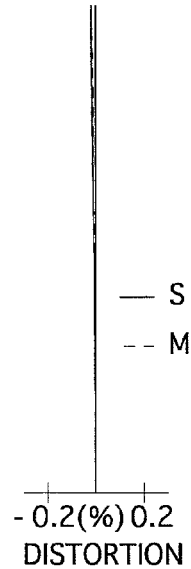
Fig.12A
FNO= 1: 5.1
— SA
-- SC
-0.2  0.2
SPHERICAL
ABERRATION
CHROMATIC
ABERRATION
Fig.12B
W=9.2°
—— d Line
------ g Line
---- C Line
-0.2  0.2
LATERAL
CHROMATIC
ABERRATION
Fig.12C
W=9.2°
-0.02  0.02
ASTIGMATISM
Fig.12D
W=9.2°
— S
-- M
-0.2(%)0.2
DISTORTION

Fig.13
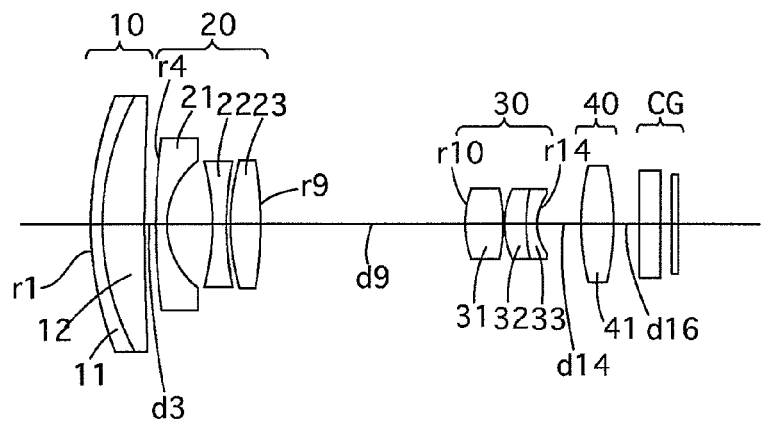
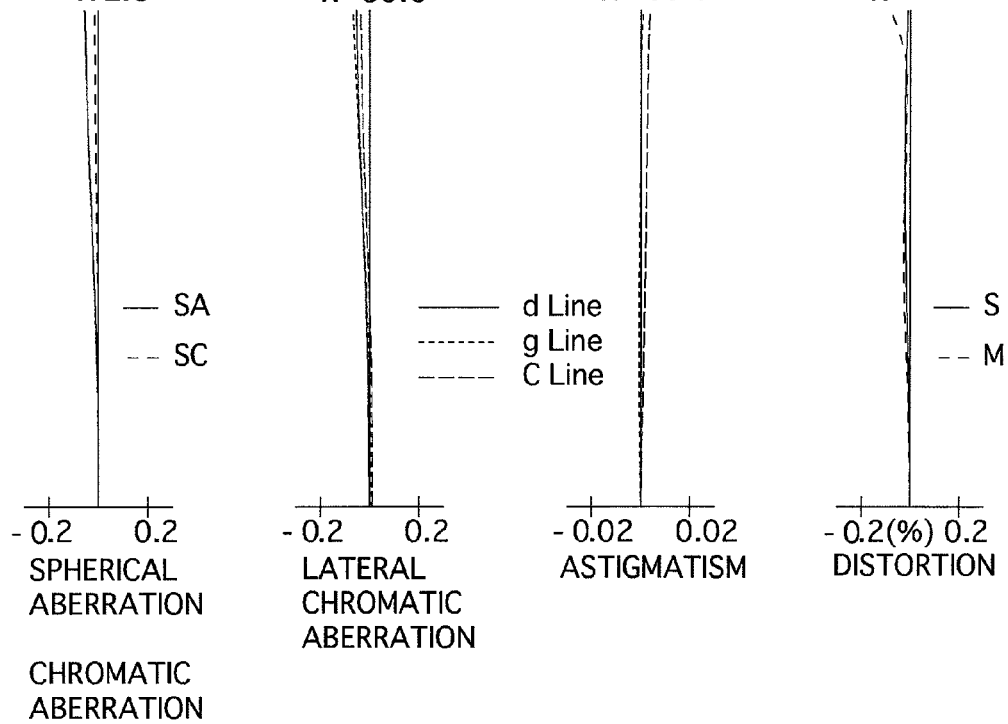

FNO=1:4.0

— SA
-- SC

-0.2  0.2
SPHERICAL
ABERRATION

CHROMATIC
ABERRATION

W=18.6°

——— d Line
------- g Line
----- C Line

-0.2  0.2
LATERAL
CHROMATIC
ABERRATION

W=18.6°

-0.02  0.02
ASTIGMATISM

W=18.6°

— S
-- M

-0.2 (%) 0.2
DISTORTION

FNO=1:5.4

— SA
-- SC

-0.2  0.2
SPHERICAL
ABERRATION

CHROMATIC
ABERRATION

W=9.2°

——— d Line
------- g Line
----- C Line

-0.2  0.2
LATERAL
CHROMATIC
ABERRATION

W=9.2°

-0.02  0.02
ASTIGMATISM

W=9.2°

— S
-- M

-0.2(%) 0.2
DISTORTION

FNO=1:2.7

- 0.2   0.2
SPHERICAL
ABERRATION

CHROMATIC
ABERRATION

— SA
-- SC

W=38.8°

- 0.2   0.2
LATERAL
CHROMATIC
ABERRATION

——— d Line
------- g Line
----- C Line

W=38.8°

- 0.02   0.02
ASTIGMATISM

W=38.8°

- 0.2(%) 0.2
DISTORTION

— S
-- M

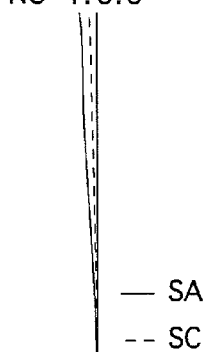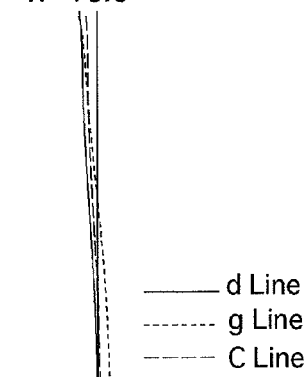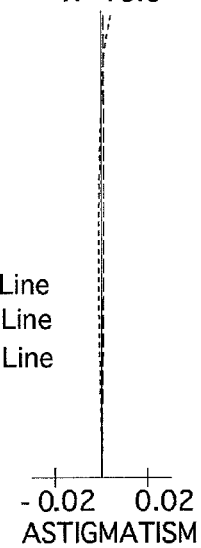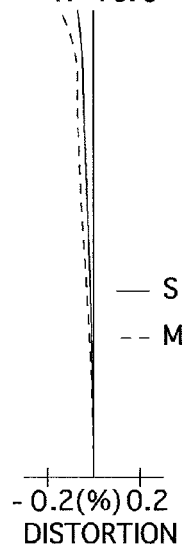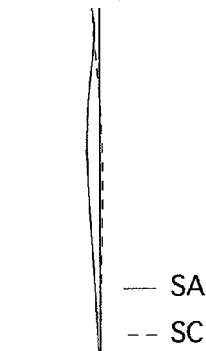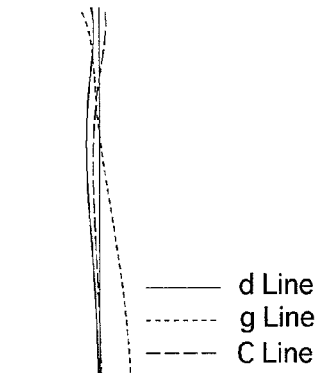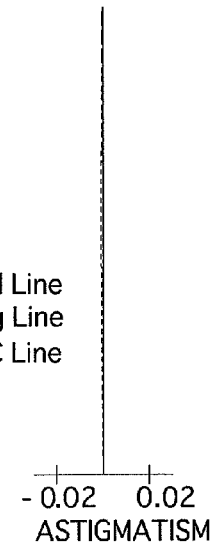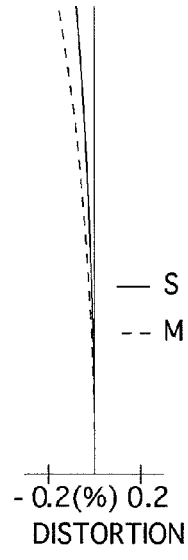

WIDE-ANGLE ZOOM LENS SYSTEM

BACKGROUND OF THE INVENTION

1. Field of the Invention

The present invention relates to a wide-angle zoom lens system which is used for a digital camera, which has a half angle-of-view exceeding 35° at the short focal length extremity, and has a zoom ratio of approximately 5.

2. Description of the Prior Art

According to miniaturization of pixels in a imaging-forming device (e.g., pixels of a CCD), there has been a demand for higher resolution in a photographing lens system which is arranged to form an image on an image-forming surface of the CCD.

Moreover, a space is required to position a filter group in front of the CCD, so that a longer back focal distance is required. Still further, in order to prevent shading or color shift, telecentricity, i.e., leading the exit light rays from the final surface (the most image-side surface of the photographing lens system) onto the image-forming surface of the CCD so that the exit light rays is incident on the image-forming surface of the CCD at a right angle.

In a wide-angle zoom lens system of the prior art, a negative-lead type zoom lens system (a negative lens group being the most object-side lens group) is often employed for up to a zoom ratio of approximately 4. However, a negative-lead type zoom lens system cannot attain a large zoom ratio. Therefore a positive-lead type zoom lens system (a positive lens group being the most object-side lens group) is employed to attain a zoom ratio 5 or more.

As examples of the prior art, Japanese Unexamined Patent Publication No. H05-027167 discloses a positive-lead type wide-angle zoom lens system which has a zoom ratio of approximately 7 to 8. However, the half angle-of-view at the short focal length extremity is only about 25°. Consequently, it is difficult to make the focal length at the short focal length extremity shorter.

Japanese Unexamined Patent Publication No. H07-020381 discloses a zoom lens system having a half angle-of-view of about 38°, which means that the focal length at the short focal length extremity can be made shorter. However, the diameter of the most object-side lens group is large, and a large number of lens elements are required, so that miniaturization thereof is insufficient.

SUMMARY OF THE INVENTION

The present invention is to provide a miniaturized wide-angle zoom lens system having the following features:

a zoom ratio of approximately 5;

a half angle-of-view of more than 35° at the short focal length extremity;

a smaller diameter of the most object-side lens group; and a smaller number of lens elements.

According to an aspect of the present invention, there is provided a wide-angle zoom lens system including a first lens group having a positive refractive power (hereinafter, a positive first lens group), a second lens group having a negative refractive power (hereinafter, a negative second lens group), a third lens group having a positive refractive power (hereinafter, a positive third lens group), and a fourth lens group having a positive refractive power (hereinafter, a positive fourth lens group), in this order from the object.

Upon zooming from the short focal length extremity to the long focal length extremity, at least said positive first lens group, said negative second lens group and said positive third lens group move along the optical axis direction so that the distance between the positive first lens group and the negative second lens group increases, the distance between the negative second lens group and the positive third lens group decreases, and the distance between the positive third lens group and the positive fourth lens group increases.

The wide-angle zoom lens system satisfies the following conditions:

$$-0.7 < f_w/f_2 < -0.5 \tag{1}$$

$$0.4 < X_1/f_t < 0.8 \tag{2}$$

wherein $f_w$ designates the focal length of the entire the wide-angle zoom lens system at the short focal length extremity;

$f_t$ designates the focal length of the entire the wide-angle zoom lens system at the long focal length extremity;

$f_2$ designates the focal length of said negative second lens group; and $X_1$ designates the traveling distance of said positive first lens group from the short focal length extremity to the long focal length extremity.

The wide-angle zoom lens system preferably satisfies the following conditions:

$$|X_1 - X_3|/f_t < 0.1 \tag{3}$$

$$0.5 < |f_2|/f_3 < 1 (f_2 < 0) \tag{4}$$

$$2 < m_{3t}/m_{3w} < 4 \tag{5}$$

wherein $X_3$ designates the traveling distance of the positive third lens group from the short focal length extremity to the long focal length extremity;

$f_t$ designates the focal length of the entire the wide-angle zoom lens system at the long focal length extremity;

$f_3$ designates the focal length of the positive third lens group;

$m_{3t}$ designates the paraxial lateral magnification of the positive third lens group at the long focal length extremity when an object at infinity is in an in-focus state; and $m_{3w}$ designates the paraxial lateral magnification of the positive third lens group at the short focal length extremity when an object at infinity is in an in-focus state.

According to another aspect of the present invention, there is provided a wide-angle zoom lens system including a positive first lens group, a negative second lens group, a positive third lens group, and a positive fourth lens group, in this order from the object.

Upon zooming from the short focal length extremity to the long focal length extremity, at least said positive first lens group, said negative second lens group and said positive third lens group move along the optical axis direction so that the distance between the positive first lens group and the negative second lens group increases, the distance between the negative second lens group and the positive third lens group decreases, and the distance between the positive third lens group and the positive fourth lens group increases.

The wide-angle zoom lens system satisfies the following conditions:

$$-0.7 < f_w/f_2 < -0.5 \tag{1}$$

$$0.5 < |f_2|/f_3 < 1 (f_2 < 0) \tag{4}$$

$$2 < m_{3t}/m_{3w} < 4 \tag{5}$$

wherein $f_w$ designates the focal length of the entire the wide-angle zoom lens system at the short focal length extremity;

$f_2$ designates the focal length of the negative second lens group;

$f_3$ designates the focal length of the positive third lens group;

$m_{3t}$ designates the paraxial lateral magnification of the positive third lens group at the long focal length extremity when an object at infinity is in an in-focus state; and $m_{3w}$ designates the paraxial lateral magnification of the positive third lens group at the short focal length extremity when an object at infinity is in an in-focus state.

It is preferable that the positive first lens group be moved together with the positive third lens group upon zooming, i.e., $X_1 - X_3 = 0$ The positive first lens group can include a negative lens element and a positive lens element; and the positive lens element preferably satisfies the following condition:

$$nA > 1.65 \qquad (6)$$

wherein nA designates the refractive index of the d-line of the positive lens element in the positive first lens group.

The negative second lens group can include three lens elements, i.e., a negative lens element, a negative lens element, and a positive lens element, in this order from the object; or, four lens elements, i.e., a negative lens element, a negative lens element, a positive lens element, and a negative lens element, in this order from the object.

The negative lens elements in the negative second lens group preferably satisfy the following condition:

$$nB > 1.7 \qquad (7)$$

wherein nB designates the mean value of refractive index of the d-line of the negative lens elements in the negative second lens group.

The positive third lens group preferably includes two positive lens elements and one negative lens element; and the positive fourth lens group preferably include one positive lens element.

The positive fourth lens group preferably functions as a focusing lens group.

The present disclosure relates to subject matter contained in Japanese Patent Application No. 2006-221733 (filed on Aug. 16, 2006) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the wide-angle zoom lens system according to a first embodiment of the present invention;

FIGS. 2A, 2B, 2C and 2D show aberrations occurred in the lens arrangement shown in FIG. 1 at the short focal length extremity;

FIGS. 3A, 3B, 3C and 3D show aberrations occurred in the lens arrangement shown in FIG. 1 at an intermediate focal length;

FIGS. 4A, 4B, 4C and 4D show aberrations occurred in the lens arrangement shown in FIG. 1 at the long focal length extremity;

FIGS. 7A, 7B, 7C and 7D show aberrations occurred in the lens arrangement shown in FIG. 5 at an intermediate focal length;

FIGS. 8A, 8B, 8C and 8D show aberrations occurred in the lens arrangement shown in FIG. 5 at the long focal length extremity;

FIG. 9 is a lens arrangement of the wide-angle zoom lens system according to a third embodiment of the present invention;

FIGS. 10A, 10B, 10C and 10D show aberrations occurred in the lens arrangement shown in FIG. 9 at the short focal length extremity;

FIGS. 11A, 11B, 11C and 11D show aberrations occurred in the lens arrangement shown in FIG. 9 at an intermediate focal length;

FIGS. 12A, 12B, 12C and 12D show aberrations occurred in the lens arrangement shown in FIG. 9 at the long focal length extremity;

FIG. 13 is a lens arrangement of the wide-angle zoom lens system according to a fourth embodiment of the present invention;

FIGS. 14A, 14B, 14C and 14D show aberrations occurred in the lens arrangement shown in FIG. 13 at the short focal length extremity;

FIGS. 19A, 19B, 19C and 19D show aberrations occurred in the lens arrangement shown in FIG. 17 at an intermediate focal length;

FIGS. 20A, 20B, 20C and 20D show aberrations occurred in the lens arrangement shown in FIG. 17 at the long focal length extremity.

DESCRIPTION OF THE PREFERRED EMBODIMENTS

Figure 21:
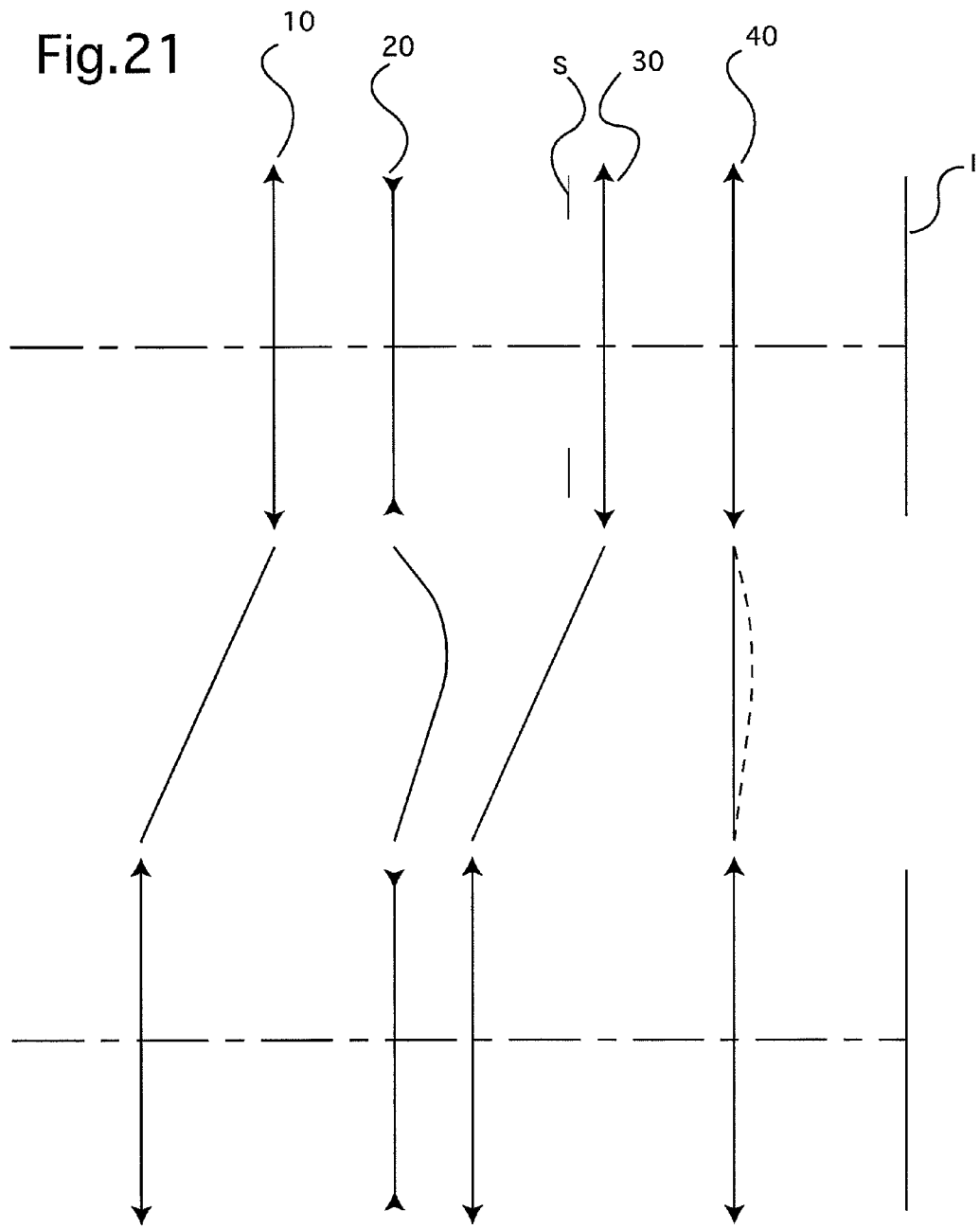
FIG. 21 is a lens-group moving paths of the wide-angle zoom lens system according to the present invention.

The wide-angle zoom lens system according to the present invention, as shown in the lens-group moving paths of FIG. 21, includes a positive first lens group 10, a negative second lens group 20, a positive third lens group 30, and a negative fourth lens group 40, in this order from the object. A symbol 'I' in FIG. 21 designates the imaging plane.

Upon zooming from the short focal length extremity to the long focal length extremity, at least the positive first lens group, the negative second lens group and the positive third lens group move along the optical axis direction so that the distance between the positive first lens group 10 and the negative second lens group 20 increases, the distance between the negative second lens group 20 and the positive third lens group 30 decreases, and the distance between the positive third lens group 30 and the positive fourth lens group 40 increases.

A diaphragm S is provided between the negative second lens group 20 and the positive third lens group 30, and moves integrally with the positive third lens group 30.

Focusing is performed by moving the positive fourth lens group 40 in the optical axis direction.

As shown in the lens-group moving paths of FIG. 21, the positive first lens group 10 and the positive third lens group 30 move monotonically toward the object; and the negative second lens group 20 first moves toward the image, and thereafter moves back toward the object; and the positive fourth lens group 40 remains stationary with respect to the imaging plane I shown by the solid line in FIG. 21 (embodiments 1 and 5), or, first moves toward the image, and thereafter moves back toward the object, as shown by the dotted line in FIG. 21 (embodiments 2 through 4).

Furthermore, it is possible that the positive first lens group 10 and the positive third lens group 30 are moved integrally. By doing so, the mechanical structure for zooming can be simplified.

Condition (1) specifies the focal length of the negative second lens group 20.

If $f_w/f_2$ exceeds the lower limit of condition (1), the negative refractive power of the negative second lens group 20 becomes too strong, so that the overall length of the wide-angle zoom lens system at the short focal length extremity becomes longer. Consequently, the correcting of coma and that of astigmatism become difficult.

If $f_w/f_2$ exceeds the upper limit of condition (1), the negative refractive power of the negative second lens group 20 becomes too weak. As a result, it becomes difficult to make the focal length of the wide-angle zoom lens system at the short focal length extremity shorter; and the zooming effect is reduced, so that a zoom ratio of approximately 5 cannot be secured.

Condition (2) specifies the traveling distance of the positive first lens group 10; and this condition is provided to reduce the diameter of the most object-side lens group (i.e., the diameter of the positive first lens group 10).

In order to miniaturize the zoom lens system (zoom lens barrel), it is important to reduce the diameter of the first lens group 10, i.e., the most object-side lens group. However, in a positive-lead type zoom lens system, over the focal length positions from the short focal length extremity to an intermediate focal length, peripheral illumination tends to reduce. This is because, in the above focal length positions, the position of the entrance pupil becomes relatively farther with respect to the positive first lens group 10, and because the angle-of-view is still large, so that the light rays have to be incident on the positive first lens group 10 at a farther point from the optical axis, i.e., the incident point of the light rays approaches the periphery of the positive first lens group 10.

If the diameter of the positive first lens group 10 is made larger, the reduction of peripheral illumination can be prevented. However, in a camera employing a retractable zoom lens barrel (zoom lens system), the entire size thereof inevitably becomes larger.

If $X_1/f_t$ exceeds the lower limit of condition (2), the diameter of the positive first lens group 10 has to be made larger, since the position of the entrance pupil near the short focal length extremity becomes relatively farther with respect to the positive first lens group 10.

If $X_1/f_t$ exceeds the upper limit of condition (2), the overall length of the wide-angle zoom lens system at the long focal length extremity becomes undesirably longer.

Condition (3) specifies the difference between the traveling distance of the positive first lens group 10 and the positive third lens group 30 upon zooming.

By setting the difference between the traveling distance of the positive first lens group 10 and the positive third lens group 30 so that condition (3) is satisfied, the overall length of the wide-angle zoom lens system at the short focal length extremity can be made shorter, and the diameter of the positive first lens group 10 can be made smaller.

If $|X_1-X_3|/f_t$ exceeds the upper limit of condition (3), the F-number at the long focal length extremity tends to be larger, and the overall length of the wide-angle zoom lens system undesirably becomes longer.

It is preferable that the positive first lens group 10 be moved together with the positive third lens group 30 upon zooming, i.e., $X_1-X_3=0$. By integrally moving these lens groups, the structure of the lens barrel can be simplified. Consequently, each of the positive first lens group 10 and the positive third lens group 30 can enhance precision with respect to decentering; and such an arrangement of the integral movement of these lens groups can stabilize image-forming performance.

Condition (4) specifies the ratio of the focal length (refractive power) of the negative second lens group 20 to that of the positive third lens group 30. These two lens groups are arranged to function as main lens groups for zooming in the four lens groups.

If $|f_2|/f_3$ exceeds the lower limit of condition (4), the negative refractive power of the negative second lens group 20 becomes stronger, so that fluctuations of aberrations upon zooming undesirably becomes larger.

If $|f_2|/f_3$ exceeds the upper limit of condition (4), the negative refractive power of the negative second lens group 20 becomes weaker, and the positive refractive power of the positive third lens group 30 also becomes weaker, so that the overall length of the wide-angle zoom lens system becomes loner.

Condition (5) specifies the ratio of the paraxial lateral magnification at the long focal length extremity to the paraxial lateral magnification at the short focal length extremity with respect to the positive third lens group 30 when an object at infinity is in an in-focus state.

If $m_{3t}/m_{3w}$ exceeds the lower limit of condition (5), the positive third lens group 30 reduces its burden for zooming. Therefore if an attempt is made to obtain a higher zoom ratio, the negative second lens group 20 has to increase its burden for zooming. Consequently, the incident point of the marginal light-rays on the positive first lens group 10 becomes farther from the optical axis, so that the diameter of the positive first lens group 10 becomes larger.

If $m_{3t}/m_{3w}$ exceeds the upper limit of condition (5), the positive third lens group 30 increases its burden for zooming, so that the traveling distance of the positive third lens group 30 for zooming becomes longer. As a result, the F-number at the long focal length extremity becomes larger.

For the purpose of reducing the overall length of the wide-angle zoom lens system, the positive first lens group 10 preferably include a negative lens element and a positive lens element. Moreover, further reduction of the overall length of the wide-angle zoom lens system becomes possible if a glass material of the positive lens element satisfies condition (6), i.e., nA>1.65.

The negative second lens group 20 can include three lens elements, i.e., a negative lens element, a negative lens element, and a positive lens element, in this order from the object, or four lens elements, i.e., a negative lens element, a negative lens element, a positive lens element, and a negative lens element, in this order from the object. By the three-lenselement arrangement and the four-lens-element arrangement, the correcting of aberrations is suitably carried out.

If an attempt is made to employ a glass material satisfying condition (7) for the negative lens elements in the negative second lens group 20, the diameter of the negative second lens group 20 can be made smaller, and the diameter of the positive first lens group 10 can also be made smaller.

The positive third lens group 30 preferably includes two positive lens elements and one negative lens element; and the positive fourth lens group 40 (the focusing lens group) preferably include one positive lens element. Due to these arrangements, the wide-angle zoom lens system can be attained with a smaller number of lens elements, such as nine lens elements or ten lens elements.

As described, the positive fourth lens group 40 which is the most image-side lens group is designed to be the focusing lens group, and is constituted by the positive single lens element. Due to these arrangements, a burden on the automatic focusing (AF) mechanism can be reduced, so that focusing at a higher speed can be attained.

Specific numerical data of the embodiments will be described hereinafter.

In the diagrams of spherical aberration and the sine condition, SA designates spherical aberration, and SC designates the sine condition.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

The tables, FNO. designates the f-number, f designates the focal length of the entire zoom lens system, W designates the half angle-of-view (°), fB designates the back focal distance, r designates the radius of curvature, d designates the lens-element thickness or a distance between lens elements (lens groups) which is variable upon zooming, $N_d$ designates the refractive index of the d-line, and v designates the Abbe number. The values for the distance "d" are indicated in the order of the short focal length extremity, an intermediate focal length and the long focal length extremity.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

Embodiment 1

FIG. 1 is the lens arrangement of the wide-angle zoom lens system according to the first embodiment of the present invention.

FIGS. 2A through 2D show aberrations occurred in the lens arrangement shown in FIG. 1 at the short focal length extremity.

FIGS. 3A through 3D show aberrations occurred in the lens arrangement shown in FIG. 1 at an intermediate focal length.

FIGS. 4A through 4D show aberrations occurred in the lens arrangement shown in FIG. 1 at the long focal length extremity.

Table 1 shows numerical date of the first embodiment.

The positive first lens group 10 (surface Nos. 1 through 3) includes cemented lens elements having a negative meniscus lens element 11 having the convex surface facing toward the object and a positive meniscus lens element 12 having the convex surface facing toward the object, in this order from the object.

The negative second lens group 20 (surface Nos. 4 through 11) includes a negative meniscus lens element 21 having the concave surface facing toward the image, a biconcave negative lens element 22, a biconvex positive lens element 23, and a biconcave negative lens element 24, in this order from the object.

The positive third lens group 30 (surface Nos. 12 through 16) includes a biconvex positive lens element 31, and cemented lens element having a positive meniscus lens element 32 having the convex surfacing toward the object and a negative meniscus lens element 33 having the convex surfacing toward the object, in this order from the object.

The positive fourth lens group 40 (surface Nos. 17 and 18) includes a biconvex positive lens element 41.

Surface Nos. 19 through 21 constitute a cover glass CG.

The diaphragm S is positioned 0.90 in front of (on the object side) the positive third lens group 30 (surface No. 12).

TABLE 1

FNO. = 1:2.6-3.4-4.9
f = 4.60-10.75-23.00
W = 38.9-18.0-8.7
$f_B$ = 0.00-0.00-0.00

| Surf. No. | r | d | $N_d$ | v |
|---|---|---|---|---|
| 1 | 22.469 | 1.00 | 1.84666 | 23.8 |
| 2 | 16.214 | 3.82 | 1.72916 | 54.7 |
| 3 | 140.015 | 0.50-7.52-11.71 | — | — |
| 4* | 125.764 | 0.80 | 1.88300 | 40.8 |
| 5 | 5.743 | 3.68 | — | — |
| 6* | −21.767 | 1.00 | 1.80610 | 40.9 |
| 7 | 62.149 | 0.10 | — | — |
| 8 | 14.885 | 2.50 | 1.84666 | 23.8 |
| 9 | −23.505 | 0.50 | — | — |
| 10 | −18.760 | 1.00 | 1.77250 | 49.6 |
| 11 | 527.320 | 13.62-6.60-2.41 | — | — |
| 12* | 7.137 | 2.70 | 1.58636 | 60.9 |
| 13* | −13.285 | 0.10 | — | — |
| 14 | 5.747 | 1.64 | 1.48749 | 70.2 |
| 15 | 13.408 | 0.80 | 1.84666 | 23.8 |
| 16 | 4.033 | 4.08-9.56-18.59 | — | — |
| 17 | 15.332 | 2.54 | 1.58913 | 61.2 |
| 18 | −26.683 | 2.30 | — | — |
| 19 | ∞ | 1.20 | 1.51633 | 64.1 |
| 20 | ∞ | 0.61 | — | — |
| 21 | ∞ | 0.50 | 1.51633 | 64.1 |
| 22 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 | A10 |
|---|---|---|---|---|---|
| 4 | 0.00 | $0.17612 \times 10^{-3}$ | $-0.99892 \times 10^{-6}$ | $-0.16228 \times 10^{-9}$ | |
| 6 | 0.00 | $-0.59331 \times 10^{-5}$ | $-0.48249 \times 10^{-5}$ | $0.46332 \times 10^{-7}$ | $0.16605 \times 10^{-8}$ |
| 12 | 0.00 | $-0.50736 \times 10^{-3}$ | $-0.47667 \times 10^{-5}$ | $-0.90896 \times 10^{-6}$ | |
| 13 | 0.00 | $0.17827 \times 10^{-3}$ | $-0.39261 \times 10^{-5}$ | $-0.93137 \times 10^{-6}$ | |

Embodiment 2

Figure 5:
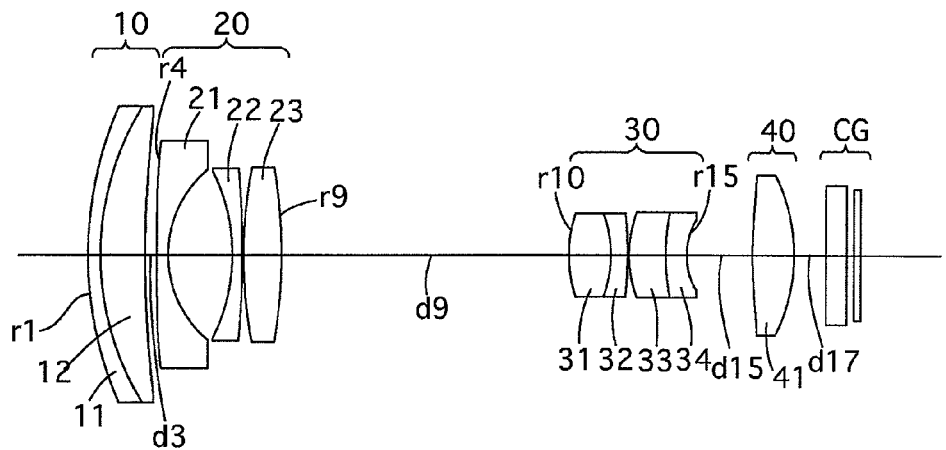
FIG. 5 is a lens arrangement of the wide-angle zoom lens system according to a second embodiment of the present invention.
Figure 6A:
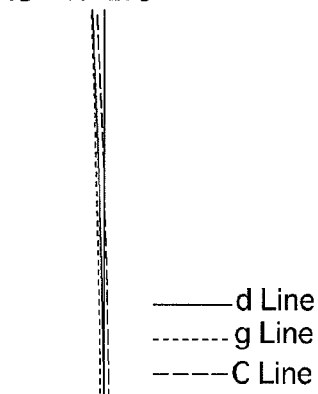
FIGS. 6A, 6B, 6C and 6D show aberrations occurred in the lens arrangement shown in FIG. 5 at the short focal length extremity.
Figure 6B:
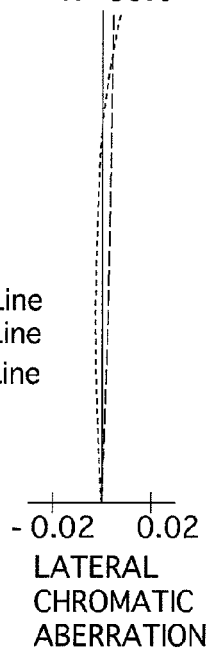
Figure 6C:
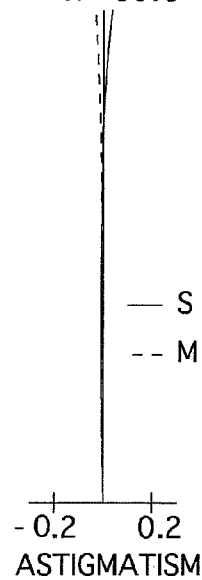
Figure 6D:
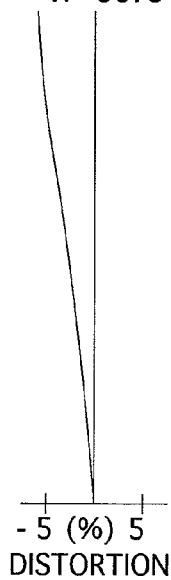
Figure 15A:
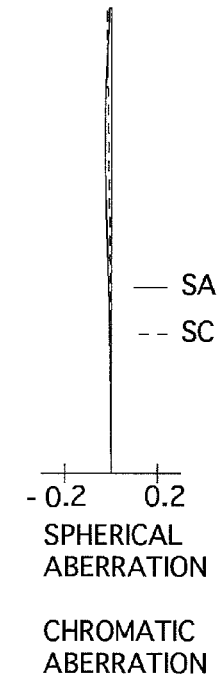
FIGS. 15A, 15B, 15C and 15D show aberrations occurred in the lens arrangement shown in FIG. 13 at an intermediate focal length.
Figure 15B:
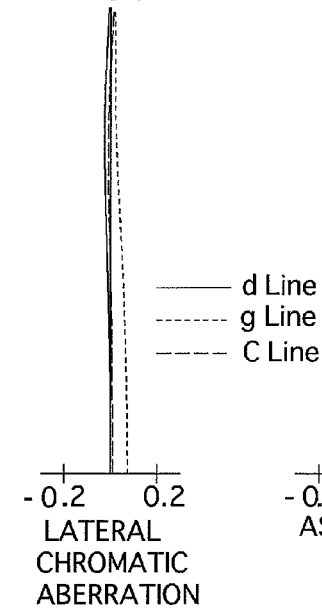
Figure 15C:
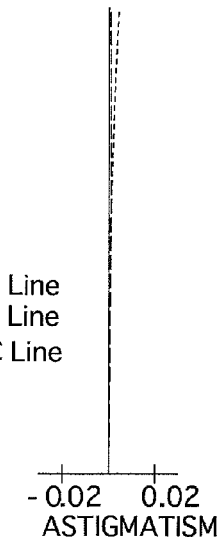
Figure 15D:
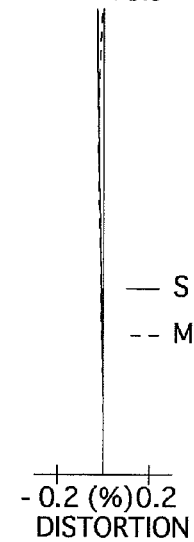
Figure 16A:
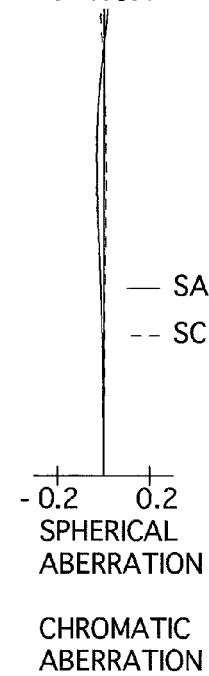
FIGS. 16A, 16B, 16C and 16D show aberrations occurred in the lens arrangement shown in FIG. 13 at the long focal length extremity.
Figure 16B:
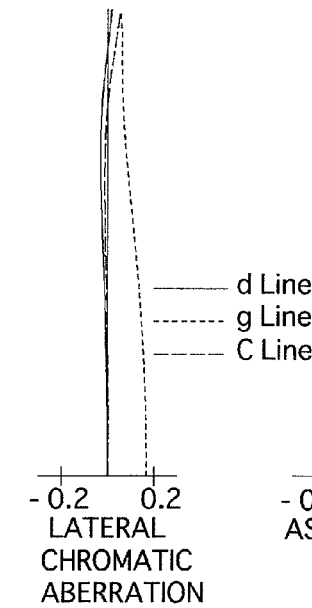
Figure 16C:
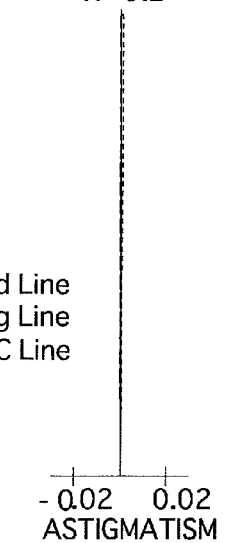
Figure 16D:
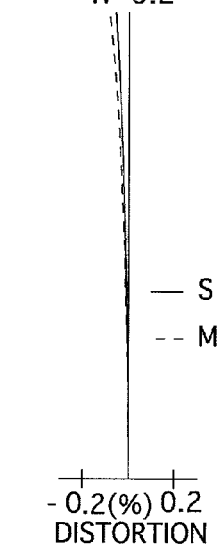

FIG. 5 is the lens arrangement of the wide-angle zoom lens system according to the second embodiment of the present invention.

FIGS. 6A through 6D show aberrations occurred in the lens arrangement shown in FIG. 5 at the short focal length extremity.

FIGS. 7A through 7D show aberrations occurred in the lens arrangement shown in FIG. 5 at an intermediate focal length.

FIGS. 8A through 8D show aberrations occurred in the lens arrangement shown in FIG. 5 at the long focal length extremity.

Table 2 shows numerical date of the second embodiment.

The negative second lens group 20 (surface Nos. 4 through 9) includes a negative meniscus lens element 21 having the concave surface facing toward the image, a negative meniscus lens element 22 having the convex surface facing toward the image, and a biconvex positive lens element 23, in this order from the object.

The positive third lens group 30 (surface Nos. 10 through 15) includes cemented lens elements having a biconvex positive lens element 31 and a negative meniscus lens element 32 having the convex surface facing toward the image, and cemented lens elements having a positive meniscus lens element 33 having the convex surface facing toward the object and a negative meniscus lens element 34 having the convex surface facing toward the object, in this order from the object.

The lens arrangement of the positive first lens group 10 and that of the positive fourth lens group 40 are the same as those of the first embodiment.

The diaphragm S is positioned 0.97 in front of (on the object side) the positive third lens group 30 (surface No. 10).

TABLE 2

FNO. = 1:2.8-4.5-4.9
f = 5.80-18.00-29.00
W = 39.3-13.7-8.5
$f_B$ = 0.00-0.00-0.00

| Surf. No. | r | d | $N_d$ | ν |
|---|---|---|---|---|
| 1 | 26.184 | 0.90 | 1.84666 | 23.8 |
| 2 | 20.063 | 3.18 | 1.72916 | 54.7 |
| 3 | 88.619 | 0.80-13.07-18.76 | — | — |
| 4* | 509.856 | 0.80 | 1.83481 | 42.7 |
| 5 | 7.883 | 4.59 | — | — |
| 6 | -13.267 | 0.70 | 1.72916 | 54.7 |
| 7 | -71.438 | 0.10 | — | — |
| 8 | 33.633 | 2.72 | 1.84666 | 23.8 |
| 9 | -37.422 | 20.51-8.22-2.57 | — | — |
| 10* | 9.350 | 3.00 | 1.58913 | 61.2 |
| 11 | -8.201 | 1.21 | 1.56138 | 45.2 |
| 12* | -26.353 | 0.10 | — | — |
| 13 | 8.837 | 2.59 | 1.69680 | 55.5 |
| 14 | 14.995 | 1.50 | 1.84666 | 23.8 |
| 15 | 4.863 | 4.71-14.46-17.97 | — | — |

TABLE 2-continued

FNO. = 1:2.8-4.5-4.9
f = 5.80-18.00-29.00
W = 39.3-13.7-8.5
$f_B$ = 0.00-0.00-0.00

| Surf. No. | r | d | $N_d$ | ν |
|---|---|---|---|---|
| 16* | 32.887 | 3.00 | 1.62041 | 60.3 |
| 17 | -12.536 | 2.29-1.01-2.91 | — | — |
| 18 | ∞ | 1.50 | 1.51633 | 64.1 |
| 19 | ∞ | 0.50 | — | — |
| 20 | ∞ | 0.50 | 1.51633 | 64.1 |
| 21 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 4 | 0.00 | $0.76906 \times 10^{-4}$ | $-0.34685 \times 10^{-6}$ | $0.88712 \times 10^{-9}$ |
| 10 | 0.00 | $-0.14712 \times 10^{-3}$ | $-0.19276 \times 10^{-6}$ | $-0.23220 \times 10^{-7}$ |
| 12 | 0.00 | $0.13723 \times 10^{-3}$ | $0.79423 \times 10^{-6}$ | $-0.30830 \times 10^{-7}$ |
| 16 | 0.00 | $-0.14931 \times 10^{-3}$ | $-0.10607 \times 10^{-5}$ | $0.17224 \times 10^{-7}$ |

Embodiment 3

FIG. 9 is the lens arrangement of the wide-angle zoom lens system according to the third embodiment of the present invention.

FIGS. 10A through 10D show aberrations occurred in the lens arrangement shown in FIG. 9 at the short focal length extremity.

FIGS. 11A through 11D show aberrations occurred in the lens arrangement shown in FIG. 9 at an intermediate focal length.

FIGS. 12A through 12D show aberrations occurred in the lens arrangement shown in FIG. 9 at the long focal length extremity.

Table 3 shows numerical date of the third embodiment.

The negative second lens group 20 (surface Nos. 4 through 9) includes a negative meniscus lens element 21 having the concave surface facing toward the image, a negative biconcave lens element 22, and a biconvex positive lens element 23, in this order from the object. The lens arrangement of the positive first lens group 10, the positive third lens group 30, and that of the positive fourth lens group 40 are the same as those of the first embodiment.

The diaphragm S is positioned 0.75 in front of (on the object side) the positive third lens group 30 (surface No. 10).

TABLE 3

FNO. = 1:2.8-4.2-5.1
f = 4.40-12.00-20.90
W = 40.2-15.7-9.2
$f_B$ = 0.80-0.80-0.80

| Surf. No. | r | d | $N_d$ | ν |
|---|---|---|---|---|
| 1 | 23.166 | 0.70 | 1.84666 | 23.8 |
| 2 | 17.953 | 2.74 | 1.72916 | 54.7 |
| 3 | 127.295 | 0.80-8.96-12.91 | — | — |
| 4 | 55.075 | 1.00 | 1.88300 | 40.8 |
| 5 | 5.634 | 2.84 | — | — |
| 6* | -13.346 | 1.00 | 1.80440 | 39.6 |
| 7 | 20.773 | 0.32 | — | — |
| 8 | 15.403 | 2.09 | 1.84666 | 23.8 |
| 9 | -23.963 | 14.42-6.24-2.35 | — | — |
| 10* | 6.266 | 2.61 | 1.58636 | 60.9 |
| 11* | -15.851 | 0.10 | — | — |
| 12 | 6.680 | 1.41 | 1.69680 | 55.5 |
| 13 | 12.940 | 0.80 | 1.84666 | 23.8 |
| 14 | 3.753 | 4.03-11.54-17.04 | — | — |
| 15* | 24.000 | 2.34 | 1.58636 | 60.9 |
| 16 | -11.228 | 1.71-1.18-2.16 | — | — |
| 17 | ∞ | 1.50 | 1.51633 | 64.1 |
| 18 | ∞ | 0.80 | — | — |
| 19 | ∞ | 0.50 | 1.51633 | 64.1 |
| 20 | ∞ | — | — | — |

The symbol "*" designates a rotationally symmetrical aspherical surface.

Aspherical data (aspherical surface coefficients not shown are zero (0.00)):

| Surf. No. | K | A4 | A6 | A8 |
|---|---|---|---|---|
| 6 | 0.00 | $0.15309 \times 10^{-3}$ | $-0.11054 \times 10^{-5}$ | $0.94152 \times 10^{-7}$ |
| 10 | 0.00 | $-0.63315 \times 10^{-3}$ | $-0.68366 \times 10^{-5}$ | $-0.16779 \times 10^{-5}$ |
| 11 | 0.00 | $0.12851 \times 10^{-3}$ | $0.73528 \times 10^{-6}$ | $-0.21394 \times 10^{-5}$ |
| 15 | 0.00 | $-0.26910 \times 10^{-3}$ | $-0.15003 \times 10^{-5}$ | $0.33645 \times 10^{-7}$ |

Embodiment 4

FIG. 13 is the lens arrangement of the wide-angle zoom lens system according to the fourth embodiment of the present invention.

FIGS. 14A through 14D show aberrations occurred in the lens arrangement shown in FIG. 13 at the short focal length extremity.

FIGS. 15A through 15D show aberrations occurred in the lens arrangement shown in FIG. 13 at an intermediate focal length.

FIGS. 16A through 16D show aberrations occurred in the lens arrangement shown in FIG. 13 at the long focal length extremity.

Table 4 shows numerical date of the fourth embodiment.

The basic lens arrangement of the fourth embodiment is the same as that of the third embodiment.

The diaphragm S is positioned 0.75 in front of (on the object side) the positive third lens group 30 (surface No. 10).

TABLE 4

FNO. = 1:2.8-4.0-5.4
f = 4.40-10.00-20.90
W = 39.6-18.6-9.2
$f_B$ = 0.00-0.00-0.00

| Surf. No. | r | d | $N_d$ | ν |
|---|---|---|---|---|
| 1 | 24.611 | 0.80 | 1.84666 | 23.8 |
| 2 | 18.847 | 2.98 | 1.69680 | 55.5 |
| 3 | 182.273 | 0.80-7.86-12.93 | — | — |
| 4 | 45.828 | 0.80 | 1.88300 | 40.8 |
| 5 | 5.700 | 3.23 | — | — |
| 6* | -15.339 | 1.00 | 1.80610 | 40.9 |
| 7 | 22.643 | 0.30 | — | — |
| 8 | 16.490 | 2.13 | 1.84666 | 23.8 |
| 9 | -27.433 | 14.48-7.41-2.35 | — | — |
| 10* | 6.689 | 2.70 | 1.58636 | 60.9 |
| 11* | -11.872 | 0.10 | — | — |
| 12 | 5.900 | 1.52 | 1.48749 | 70.2 |
| 13 | 11.816 | 0.80 | 1.84666 | 23.8 |
| 14 | 3.680 | 3.11-9.30-16.47 | — | — |
| 15 | 17.093 | 2.29 | 1.58913 | 61.2 |
| 16 | -18.244 | 1.86-1.00-1.50 | — | — |
| 17 | ∞ | 1.50 | 1.51633 | 64.1 |
| 18 | ∞ | 0.80 | — | — |
| 19 | ∞ | 0.50 | 1.51633 | 64.1 |
| 20 | ∞ | — | — | — |

The symbol "*" designates a rotationally symmetrical aspherical surface.

Aspherical data (aspherical surface coefficients not shown are zero (0.00)):

| Surf. No. | K | A4 | A6 | A8 | A10 |
|---|---|---|---|---|---|
| 6 | 0.00 | $0.14630 \times 10^{-3}$ | $-0.24820 \times 10^{-5}$ | $0.14980 \times 10^{-6}$ | $-0.61680 \times 10^{-9}$ |
| 10 | 0.00 | $-0.85980 \times 10^{-3}$ | $-0.26740 \times 10^{-4}$ | $-0.31450 \times 10^{-5}$ | |
| 11 | 0.00 | $-0.93010 \times 10^{-4}$ | $-0.31020 \times 10^{-4}$ | $-0.23180 \times 10^{-5}$ | |

Embodiment 5

Figure 17:
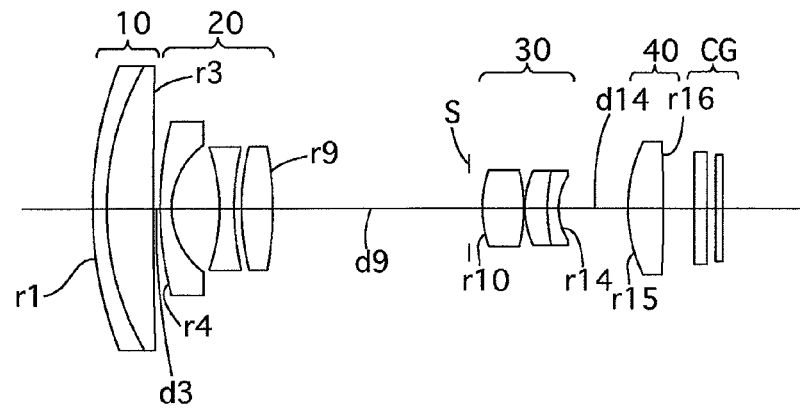
FIG. 17 is a lens arrangement of the wide-angle zoom lens system according to a fifth embodiment of the present invention.
Figure 18A:
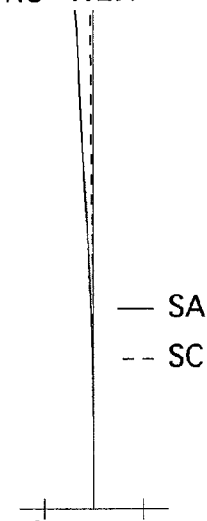
FIGS. 18A, 18B, 18C and 18D show aberrations occurred in the lens arrangement shown in FIG. 17 at the short focal length extremity.
Figure 18B:
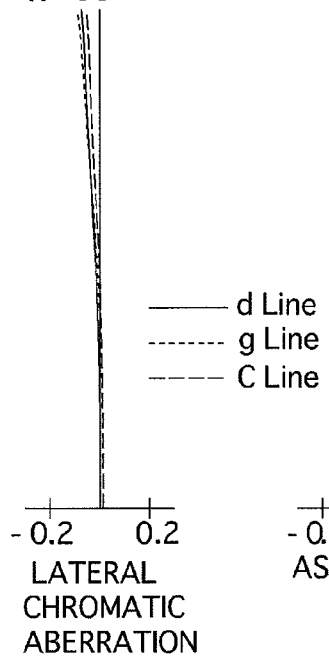
Figure 18C:
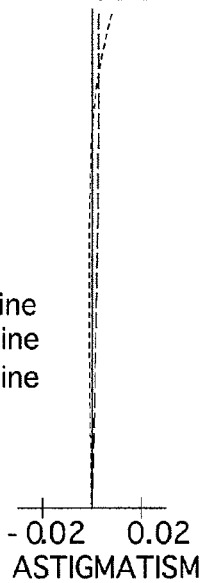
Figure 18D:
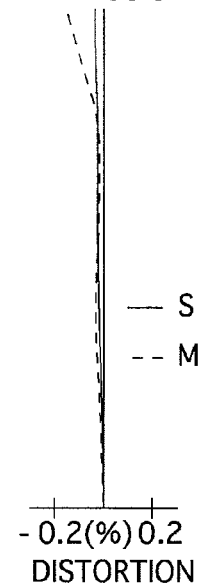

FIG. 17 is the lens arrangement of the wide-angle zoom lens system according to the fifth embodiment of the present invention.

FIGS. 18A through 18D show aberrations occurred in the lens arrangement shown in FIG. 17 at the short focal length extremity.

FIGS. 19A through 19D show aberrations occurred in the lens arrangement shown in FIG. 17 at an intermediate focal length.

FIGS. 20A through 20D show aberrations occurred in the lens arrangement shown in FIG. 17 at the long focal length extremity.

Table 5 shows numerical date of the fifth embodiment.

The basic lens arrangement of the fifth embodiment is the same as that of the third embodiment.

The diaphragm S is positioned 0.90 in front of (on the object side) the positive third lens group 30 (surface No. 10).

TABLE 5

FNO. = 1:2.7-3.5-5.0
f = 4.72-10.75-23.62
W = 38.8-18.3-8.7
$f_B$ = 0.00-0.00-0.00

| Surf. No. | r | d | $N_d$ | ν |
|---|---|---|---|---|
| 1 | 27.002 | 1.00 | 1.84666 | 23.8 |
| 2 | 19.803 | 3.33 | 1.72916 | 54.7 |
| 3 | 373.296 | 0.50-8.25-13.22 | — | — |
| 4 | 23.789 | 0.80 | 1.88300 | 40.8 |
| 5 | 5.598 | 3.35 | — | — |
| 6* | −12.756 | 1.00 | 1.80610 | 40.9 |
| 7 | 18.929 | 0.51 | — | — |
| 8 | 17.271 | 2.20 | 1.84666 | 23.8 |
| 9 | −24.650 | 14.79-7.04-2.08 | — | — |
| 10* | 7.685 | 2.90 | 1.58913 | 61.2 |
| 11* | −12.115 | 0.10 | — | — |
| 12 | 6.056 | 1.58 | 1.48749 | 70.2 |
| 13 | 12.666 | 0.80 | 1.84666 | 23.8 |
| 14 | 4.096 | 4.90-10.08-19.17 | — | — |
| 15 | 10.699 | 2.50 | 1.58913 | 61.2 |
| 16 | −100.766 | 2.20 | — | — |
| 17 | ∞ | 0.90 | 1.51633 | 64.1 |
| 18 | ∞ | 0.61 | — | — |
| 19 | ∞ | 0.50 | 1.51633 | 64.1 |
| 20 | ∞ | — | — | — |

The symbol "*" designates a rotationally symmetrical aspherical surface.

Aspherical data (aspherical surface coefficients not shown are zero (0.00)):

| Surf. No. | K | A4 | A6 | A8 | A10 |
|---|---|---|---|---|---|
| 6 | 0.00 | $0.15140 \times 10^{-3}$ | $-0.12182 \times 10^{-4}$ | $0.67665 \times 10^{-6}$ | $-0.16395 \times 10^{-7}$ |
| 10 | 0.00 | $-0.76456 \times 10^{-3}$ | $-0.67663 \times 10^{-5}$ | $-0.24541 \times 10^{-5}$ | |
| 11 | 0.00 | $-0.20600 \times 10^{-3}$ | $-0.75827 \times 10^{-5}$ | $-0.20300 \times 10^{-5}$ | |

The numerical values of each condition for each numerical embodiment are shown in Table 6.

| | Embod. 1 | Embod. 2 | Embod. 3 | Embod. 4 | Embod. 5 |
|---|---|---|---|---|---|
| Cond. (1) | −0.659 | −0.536 | −0.523 | −0.569 | −0.548 |
| Cond. (2) | 0.630 | 0.467 | 0.479 | 0.646 | 0.622 |
| Cond. (3) | 0.000 | 0.001 | 0.001 | 0.002 | 0.000 |
| Cond. (4) | 0.660 | 0.801 | 0.805 | 0.716 | 0.755 |
| Cond. (5) | 2.956 | 2.693 | 2.829 | 2.966 | 2.853 |
| Cond. (6) | 1.72916 | 1.72916 | 1.72916 | 1.69680 | 1.72916 |
| Cond. (7) | 1.82053 | 1.78199 | 1.84370 | 1.84455 | 1.84455 |

As can be understood from Table 6, the first through fifth numerical embodiments satisfy conditions (1) through (7). Furthermore, as can be understood from the aberration diagrams, the various aberrations are adequately corrected.

According to the above descriptions, a miniaturized wide-angle zoom lens system having the following features can be obtained:

a zoom ratio of approximately 5;

a half angle-of-view of more than 35° at the short focal length extremity;

a smaller diameter of the most object-side lens group; and a smaller number of lens elements.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A wide-angle zoom lens system comprises a positive first lens group, a negative second lens group, a positive third lens group, and a positive fourth lens group, in this order from an object, wherein upon zooming from the short focal length extremity to the long focal length extremity, at least said positive first lens group, said negative second lens group and said positive third lens group move along the optical axis direction so that the distance between said positive first lens group and said negative second lens group increases, the distance between said negative second lens group and said positive third lens group decreases, and the distance between said positive third lens group and said positive fourth lens group increases; and wherein said wide-angle zoom lens system satisfies the following conditions:

$-0.7 < f_w/f_2 < -0.5$ $0.4 < X_1/f_t < 0.8$ wherein $f_w$ designates the focal length of the entire the wide-angle zoom lens system at the short focal length extremity;

$f_t$ designates the focal length of the entire the wide-angle zoom lens system at the long focal length extremity;

$f_2$ designates the focal length of said negative second lens group; and $X_1$ designates the traveling distance of said positive first lens group from the short focal length extremity to the long focal length extremity.

2. The wide-angle zoom lens system according to claim 1, further satisfying the following conditions:

$|X_1 - X_3|/f_t < 0.1$ $0.5 < |f_2/f_3| < 1 (f_2 < 0)$ $2 < m_{3t}/m_{3w} < 4$ wherein $X_3$ designates the traveling distance of said positive third lens group from the short focal length extremity to the long focal length extremity;

$f_3$ designates the focal length of said positive third lens group;

$m_{3t}$ designates the paraxial lateral magnification of said positive third lens group at the long focal length extremity when an object at infinity is in an in-focus state; and $m_{3w}$ designates the paraxial lateral magnification of said positive third lens group at the short focal length extremity when an object at infinity is in an in-focus state.

3. The wide-angle zoom lens system according to claim 1, wherein said positive first lens group is moved together with said positive third lens group upon zooming.

4. The wide-angle zoom lens system according to claim 1, wherein said positive first lens group comprises a negative lens element and a positive lens element; and wherein said positive lens element satisfies the following condition:

$$nA > 1.65$$

wherein nA designates the refractive index of the d-line of said positive lens element in said positive first lens group.

5. The wide-angle zoom lens system according to claim 1, wherein said negative second lens group comprises a negative lens element, a negative lens element, and a positive lens element, in this order from the object; and wherein said negative lens elements in said negative second lens group satisfy the following condition:

$$nB > 1.7$$

wherein nB designates the mean value of refractive index of the d-line of said negative lens elements in said negative second lens group.

6. The wide-angle zoom lens system according to claim 1, wherein said negative second lens group comprises a negative lens element, a negative lens element, a positive lens element, and a negative lens element, in this order from the object; and wherein said negative lens elements in said negative second lens group satisfy the following condition:

$$nB > 1.7$$

wherein nB designates the mean value of refractive index of the d-line of said negative lens elements in said negative second lens group.

7. The wide-angle zoom lens system according to claim 1, wherein said positive third lens group comprises two positive lens elements and a negative lens element; and wherein said positive fourth lens group comprises a positive lens element.

8. The wide-angle zoom lens system according to claim 1, wherein said positive fourth lens group is arrange to function as a focusing lens group.

9. A wide-angle zoom lens system comprises a positive first lens group, a negative second lens group, a positive third lens group, and a positive fourth lens group, in this order from an object, wherein upon zooming from the short focal length extremity to the long focal length extremity, at least said positive first lens group, said negative second lens group and said positive third lens group move along the optical axis direction so that the distance between said positive first lens group and said negative second lens group increases, the distance between said negative second lens group and said positive third lens group decreases, and the distance between said positive third lens group and said positive fourth lens group increases; and wherein said wide-angle zoom lens system satisfies the following conditions:

$$-0.7 < f_w/f_2 < -0.5$$

$$0.5 < |f_2|/f_3 < 1 (f_2 < 0)$$

$$2 < m_{3t}/m_{3w} < 4$$

wherein $f_w$ designates the focal length of the entire the wide-angle zoom lens system at the short focal length extremity;

$f_2$ designates the focal length of said negative second lens group;

$f_3$ designates the focal length of said positive third lens group;

$m_{3t}$ designates the paraxial lateral magnification of said positive third lens group at the long focal length extremity when an object at infinity is in an in-focus state; and $m_{3w}$ designates the paraxial lateral magnification of said positive third lens group at the short focal length extremity when an object at infinity is in an in-focus state.

10. The wide-angle zoom lens system according to claim 9, wherein said positive first lens group is moved together with said positive third lens group upon zooming.

11. The wide-angle zoom lens system according to claim 9, wherein said positive first lens group comprises a negative lens element and a positive lens element; and wherein said positive lens element satisfies the following condition:

$$nA > 1.65$$

wherein nA designates the refractive index of the d-line of said positive lens element in said positive first lens group.

12. The wide-angle zoom lens system according to claim 9, wherein said negative second lens group comprises a negative lens element, a negative lens element, and a positive lens element, in this order from the object; and wherein said negative lens elements in said negative second lens group satisfy the following condition:

$$nB > 1.7$$

wherein nB designates the mean value of refractive index of the d-line of said negative lens elements in said negative second lens group.

13. The wide-angle zoom lens system according to claim 9, wherein said negative second lens group comprises a negative lens element, a negative lens element, a positive lens element, and a negative lens element, in this order from the object; and wherein said negative lens elements in said negative second lens group satisfy the following condition:

$$nB > 1.7$$

wherein nB designates the mean value of refractive index of the d-line of said negative lens elements in said negative second lens group.

14. The wide-angle zoom lens system according to claim 9, wherein said positive third lens group comprises two positive lens elements and a negative lens element; and wherein said positive fourth lens group comprises a positive lens element.

15. The wide-angle zoom lens system according to claim 9, wherein said positive fourth lens group is arranged to function as a focusing lens group.

* * * * *